United States Patent Office 3,036,074
Patented May 22, 1962

3,036,074
ESTERS OF NITRIC ACID OF OXYALKYL-AMIDES AND PROCESS FOR THE PRODUCTION OF SUCH ESTERS
Ernst Stieglitz, 1 Poststrasse, and Manfred Matz, Mayberstrasse, both of Eitorf (Sieg), Germany
No Drawing. Filed Mar. 25, 1957, Ser. No. 647,998
Claims priority, application Germany Mar. 28, 1956
10 Claims. (Cl. 260—256)

The present invention relates to esters of nitric acid of oxyalkyl-amides which are interesting compounds in view of the manufacture of pharmaceutical products.

The invention relates especially to esters of N-polyoxylalkyl-amides of dimethyl-xanthine-alkyl-carboxylic-acid.

Further the invention relates to a process for the production of said esters.

The reaction of alkanolamines with fuming nitric acid produces under certain conditions the corresponding esters of nitric acid, which constitute interesting compounds from the point of view both of the manufacture of explosives and pharmaceutical products.

It has now been found that the not yet known nitroxy alkylamides of aliphatic, aromatic and heterocyclic mono- and dicarboxylic acids are also physiologically interesting compounds. They have the advantage over the esters of nitric acid of the alkanolamines that they are easy to handle and that they constitute well crystallized compounds which are also stable in aqueous solution. The nitroxy-alkyl-carboxyl-amides according to the present invention have the general formula

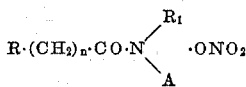

where
$n$ is the figure 0 or 1,
A is a lower alkyl residue,
R is alkyl, aryl, aralkyl, cycloalkyl or a heterocyclic residue, and
$R_1$ is hydrogen, alkyl or nitroxy alkyl, and more than one correspondingly substituted group of carboxylic acid can be contained in the molecule. The compounds can be obtained by direct nitration of the corresponding oxyalkylamides of carboxylic acid of the general formula

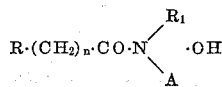

where $n$, R and A have the meaning referred to above and $R_1$ stands for hydrogen, alkyl and oxyalkyl, and also more than one correspondingly substituted carboxylic acid group can be contained in the molecule. As, for example, with the direct nitration of aromatic oxyalkylamides of carboxylic acid a nuclear nitration may occur, such compounds can be obtained by reacting a derivative of carboxylic acid, such as the chloride of the acid, with corresponding nitroxyalkylamines. Particularly valuable substances are obtained with the method forming the object of the invention by starting from dimethyl-xanthinecarboxylicacid-N-polyoxyalkylamides.

The objects of the invention are further new esters of nitric acid of various dimethyl-xanthinealkyl-carboxylic-acid-N-polyoxy-alkylamides with the general formula

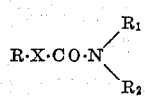

in which
R means a dimethylxanthine substituted in positions 1 and 3 or 1 and 7,
$R_1$=H or alkyl,
$R_2$ a rectilinear or chainlike ramified polynitroxy alkyl residue and
X an unramified or ramified alkyl group with a maximum of 8, especially 1 to 4 C atoms in a straight chain.

These esters possess excellent therapeutical properties with an extremely low toxicity and cause in particular an increased coronary flow.

These esters of nitric acid are obtained by reaction of a dimethyl-xanthine-alkyl-carboxylic acid-N-polyoxyalkyl-amide of the general formula

R—X—CO·Y where Y means the residue of a primary or secondary polyoxy-alkylamine, R and X having the meaning referred to above with nitration agents, such as anhydrous nitric acid in excess at preferably low temperatures or a mixture of concentrated nitric acid and concentrated sulphuric acid. A very suitable starting material is trimethylol methylamide of theophylline or theobromineacetic-acid-trimethylolmethylamid or the corresponding glucamide or its N-mono-alkyl derivative.

The compounds obtained constitute well crystallized substances which, when used for the manufacture of explosives, do not possess the highly explosive properties of the nitroglycerin or nitropentaerythrite and are therefore easy to handle. Polyoxyalkylamides are particularly suitable as a starting material.

Example 1

20 grams of oxyethylamide acetate are slowly added to 0.025 liter of fuming nitric acid at —10° C. The nitrating mixture is allowed to stand for some hours at 0° C., whereupon the excess of nitric acid is removed first with dibutyl ether, then with diethyl ether.

Mononitroethanol amide acetate distills at 0.5 mm. Hg/ 170–175° C.

Example 2

15 grams of dioxydiethyl amide stearate are nitrated, as in Example 1, with 0.02 liter of fuming nitric acid at 10° C., allowed to stand for some hours at 0° C., and then diluted with ice water. Dinitroxydiethyl amide stearate is obtained as a wax-like product which is recrystallized from absolute alcohol. Flash point 108° C.

Example 3

2.95 grams of monoethanol amide of theophylline acetic acid are reacted with 5 grams of fuming nitric acid at —10° C., and the nitrating mixture is kept in the refrigerator for 12 hours. Thereafter the solution of nitric acid is little by little introduced into intensely cooled absolute ether which is to be kept in movement by stirring, and the ester will precipitate as a white, partly greasy substance. The etheric layer is decanted, and the residue is recrystallized from absolute alcohol. Flash point 169° C.

Example 4

5 grams of dioxydiethyl amide of theophylline acetic acid are esterified in the usual way with 10 grams of fuming nitric acid, and the ester formed is precipitated by introducing the reaction mixture into ether. The crystalline precipitate is separated, cleaned with a good deal of water from adhering nitric acid and recrystallized from absolute alcohol. Flash point 124° C.

Example 5

5 grams of bivalent ethanolamide of theophylline malonic acid are gradually introduced into 15 ccm. of fuming nitric acid at −10° C. and allowed to esterify for 12 hours in the cold. The ester which has formed is precipitated by pouring the reaction product into an excess of intensely cooled ether; the ether is then decanted and the residue washed free from nitric acid with water. After recrystallization from alcohol the pure bivalent nitroxyethyl amide of theophylline malonic acid melts at 166–168° C.

*Example 6*

Dinitroxydiethyl amide of theobromine acetic acid: similar to Example 4 from dioxydiethyl amide of theobromine acetic acid and fuming nitric acid. Recrystallized from absolute alcohol it has a flash point of 194–196° C.

*Example 7*

Bivalent nitroxyethyl amide of theobromine malonic acid, similar to Example 5 from bivalent monoethanol amide of theobromine malonic acid and fuming nitric acid. Flash point above 300° C., recrystallized from acetonitrile.

*Example 8*

20 grams of dioxydiethyl amide of nicotinic acid are esterified at −10° C. with 24 grams of fuming nitric acid, and the reaction product is after several hours introduced into cold ether. The etheric layer is decanted, and the nitrate of the acid dinitroxydiethyl amide nicotinate is again digested with fresh ether. The nitrate obtained in the form of a yellow oil is treated with cold aqueous $NaHCO_3$ solution, and the pure dinitroxydiethyl amide nicotinate separates as oil. The oil is dissolved in chloroform, dried with $Na_2SO_4$, and the filtrate is shaken with some animal charcoal. The chloroform solution obtained in this way is freed under vacuum from the solvent, and the yellow oily residue is dried above $P_2O_5$ under high vacuum. With a little absolute alcohol a voluminous amorphous substance is obtained from the oil, which, when boiled in a little acetone, sucked off and dried, melts at 145° C. If the alcoholic solution of this substance is mixed with an etheric solution of oxalic acid, the well crystallizing oxalate melting at 168° C. is formed.

*Example 9*

From 3-mole bis-(β-nitroxyethyl)-ammonium nitrate an etheric solution of the free base is prepared by decomposition with an aqueous sodium-hydrogen-carbonate solution at 0° C. and reacted with 1-mole phenyl acetic-acid chloride in ether in the cold. The solution is filtered off from the precipitated bivalent (β-nitroxyethyl)-ammonium chloride and the ether solution washed with water till no chloride can be proven. The solution is dried with sodium sulphate and the solvent removed under vacuum. The residue is crystallized in the deep freezer and can be recrystallized from aqueous alcohol for purification. White crystals with a flash point of 89–92° C.

*Example 10*

According to the method described in Example 9, a 2-mole bis-(β-nitroxyethyl)-amine is reacted with 1-mole diphenyl acetic-acid chloride in the cold with ether as solvent. After the usual preparation the diphenyl acetic and dinitroxydiethyl amide, which is at first oily, is recrystallized from a water-and-alcohol mixture (2:1). White crystals with a flash point of 118° C.

*Example 11*

24 grams of theophylline-7-acetic acid-N-ethyl-N-(β,γ-dioxypropyl)-amide are introduced by batches into 80 grams of cold fuming nitric acid (d 1.52) at −10° C., and the reaction mixture is allowed to esterify for one hour. To separate the ethyl nitrate which has formed, the red-brown solution is little by little poured into an excess of intensely cooled ether. The precipitating, oily precipitate crystallizes when treated with water.

Theophylline-7-acetic acid-N-ethyl-N-(β,γ-dinitroxypropyl)-amide melts at 114–116° C.

*Example 12*

12 grams of trimethylolmethyl amide of theophylline-7-acetic acid are gradually introduced into 10 grams of cold fuming nitric acid (d 1.52) at −10° C., so that the temperature of the reaction mixture does not exceed 0° C. After one hour the reaction mixture is poured into an excess of ice water, with the ethyl nitrate separating as a white, greasy product which is recrystallized from absolute alcohol.

Theophylline - 7 - acetic acid-N-[(trinitroxy - methyl)-methyl]-amide melts at 153–154° C.

What we claim is:

1. Theophylline-7-acetic acid-β-nitratoethyl)-amide.
2. Theophylline-7-acetic acid-bis(β-nitratoethyl)-amide.
3. Theophylline - 7 - malonic acid - bis(β-nitratoethyl-amide).
4. Theophylline-7-acetic acid-N-ethyl-N-(β,γ-dinitrato-propyl)-amide.
5. Theophylline-7-acetic acid-N-tris-(nitrato-methyl)-methyl amide.
6. Theobromine-1-acetic acid-bis-(β-nitrato-ethyl)-amide.
7. Theobromine - 1 - malonic acid-bis-(β-nitrato-ethyl-amide).
8. Process for the production of an amide having the following general formula:

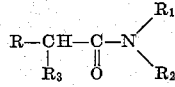

which comprises reacting fuming nitric acid (d 1.52) at a temperature between −10 and 10° C. with an amide of the general formula

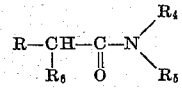

wherein in said formulae R is a member selected from the group consisting of 7-theophyllinyl and 1-theobrominyl radicals, $R_1$ is a member selected from the group consisting of hydrogen, lower alkyl radicals and nitrato lower alkyl radicals, $R_2$ is a member selected from the group of nitrato lower alkyl radicals having from 1 to 3 nitrato groups, $R_3$ is a member selected from the group consisting of hydrogen and amide radicals having the following general formula:

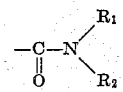

wherein $R_1$ and $R_2$ are as defined above, $R_4$ is a member selected from the group consisting of hydrogen, lower alkyl radicals and lower hydroxyalkyl radicals, $R_5$ is a member selected from the group consisting of lower hydroxyalkyl radicals having from one to three hydroxy groups and $R_6$ is a member selected from the group consisting of hydrogen and amide radicals having the general formula:

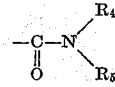

wherein $R_4$ and $R_5$ are as defined above.

9. An amide of the formula

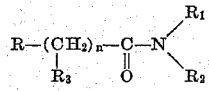

wherein R is a heterocyclic N containing radical selected from the group consisting of piperidyl ($C_5H_{10}N-$), theophyllinyl

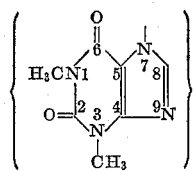

theobrominyl

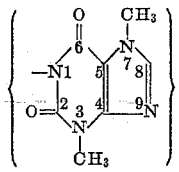

and 3-ring substituted pyridyl radicals ($C_5H_4N-$) in which said ring substituent is $R_3$, $n$ is an integer from 0 to 1, $R_1$ is a member selected from the group consisting of hydrogen, lower alkyl radicals nitrato lower alkyl radicals, $R_2$ is a member selected from the group consisting of nitrato lower alkyl radicals having from 1 to 3 nitrato groups, $R_3$ is a member selected from the group consisting of hydrogen and amide radicals having the following formula:

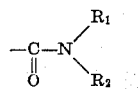

wherein $R_1$ and $R_2$ are as defined above.

10. Process for the production of an amide having the following formula:

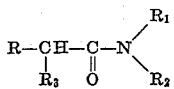

which comprises reacting fuming nitric acid (d 1.52) at a temperature between $-10$ and $10°$ C. with an amide of the formula:

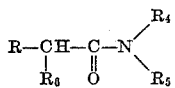

wherein R is a heterocyclic N containing radical selected from the group consisting of piperidyl ($C_5H_{10}N-$), theophyllinyl

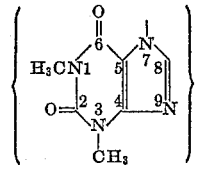

theobrominyl

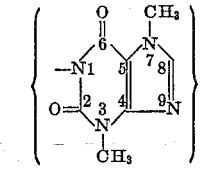

and 3-ring substituted pyridyl radicals ($C_5H_4N-$) in which said ring substituent is $R_3$, $R_1$ is a member selected from the group consisting of hydrogen, lower alkyl radicals and nitrato lower alkyl radicals, $R_2$ is a member selected from the group consisting of nitrato lower alkyl radicals having 1 to 3 nitrato groups, $R_3$ is a member selected from the group consisting of hydrogen and amide radicals having the following formula:

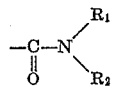

wherein $R_1$ and $R_2$ are as defined above, $R_4$ is a member selected from the group consisting of hydrogen lower alkyl radicals and lower hydroxy radicals, $R_5$ is a member selected from the group consisting of lower hydroxy alkyl radicals having from 1 to 3 hydroxy groups and $R_6$ is a member selected from the group consisting of hydrogen and amide radicals having the formula

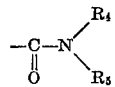

wherein $R_4$ and $R_5$ are as defined above.

References Cited in the file of this patent

UNITED STATES PATENTS

| | | |
|---|---|---|
| 2,420,306 | Filbert | May 13, 1947 |
| 2,443,903 | Frederick | June 22, 1948 |
| 2,718,521 | Heywood | Sept. 20, 1955 |
| 2,729,643 | Stoll et al. | Jan. 3, 1956 |

OTHER REFERENCES

Chemical Abstracts, vol. 51, pages 16494–16495 (1957).